(12) United States Patent
Li et al.

(10) Patent No.: US 12,244,214 B2
(45) Date of Patent: Mar. 4, 2025

(54) SINGLE-PHASE AND THREE-PHASE COMPATIBLE AC-DC CONVERSION CIRCUIT AND METHOD OF DETECTING INPUT CURRENT THEREOF

(71) Applicant: DELTA ELECTRONICS, INC., Taoyuan (TW)

(72) Inventors: Cheng-Te Li, Taoyuan (TW); Nian-Ci Chen, Taoyuan (TW); Chih-Yuan Chuang, Taoyuan (TW); Cheng-Hao Hsueh, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 289 days.

(21) Appl. No.: 17/714,841

(22) Filed: Apr. 6, 2022

(65) Prior Publication Data
US 2023/0035838 A1 Feb. 2, 2023

(30) Foreign Application Priority Data
Jul. 30, 2021 (CN) .......................... 202110870043.5

(51) Int. Cl.
*H02M 1/00* (2007.01)
*H02M 1/10* (2006.01)
(Continued)

(52) U.S. Cl.
CPC ........... *H02M 1/0009* (2021.05); *H02M 1/10* (2013.01); *H02M 1/32* (2013.01); *H02M 1/4216* (2013.01);
(Continued)

(58) Field of Classification Search
CPC .. H02M 7/219; H02M 1/4216; H02M 1/4233; H02M 1/36
See application file for complete search history.

(56) References Cited

U.S. PATENT DOCUMENTS 7,646,160 B2     1/2010  Chen et al.
11,677,328 B2 *  6/2023  Liu ..................... H02M 7/5387
                                                    363/127
(Continued)

FOREIGN PATENT DOCUMENTS

CN     109861357 A     6/2019
CN     109889077 A  *  6/2019 ............. B60L 53/22
(Continued)

*Primary Examiner* — Gustavo A Rosario-Benitez
(74) *Attorney, Agent, or Firm* — MUNCY, GEISSLER, OLDS & LOWE, P.C.

(57) ABSTRACT

An AC-DC conversion circuit provides a three-phase power source. The AC-DC conversion circuit includes a first inductor, a second inductor, a third inductor, a switch bridge arm assembly, and a control unit. The switch bridge arm assembly includes three switch bridge arms, and each switch bridge arm includes an upper switch and a lower switch. A plurality of common-connected nodes between the upper switches and the lower switches are coupled to the three-phase power source through the first inductor, the second inductor, and the third inductor. The control unit turns on the upper switch and the lower switch to provide a current detection loop. The control unit acquires a magnitude of a first current flowing through the first inductor and a magnitude of a third current flowing through the third inductor, and determines whether a current detection mechanism of the first current and the third current is normal.

16 Claims, 13 Drawing Sheets

(51) Int. Cl.
*H02M 1/32* (2007.01)
*H02M 1/42* (2007.01)
*H02M 7/219* (2006.01)
*H02M 1/36* (2007.01)

(52) U.S. Cl.
CPC ......... *H02M 1/4233* (2013.01); *H02M 7/219* (2013.01); *H02M 1/36* (2013.01)

(56) References Cited

U.S. PATENT DOCUMENTS

| | | | | |
|---|---|---|---|---|
| 2008/0265819 | A1* | 10/2008 | Chen | G01R 31/42 |
| | | | | 318/490 |
| 2011/0292696 | A1* | 12/2011 | Xiao | H02M 5/4585 |
| | | | | 324/548 |
| 2016/0056750 | A1* | 2/2016 | West | H02P 29/024 |
| | | | | 318/490 |
| 2017/0149343 | A1* | 5/2017 | Bhandarkar | H02M 5/458 |
| 2020/0007027 | A1* | 1/2020 | Fujioka | H02M 1/32 |
| 2020/0023746 | A1* | 1/2020 | Kim | B60L 53/14 |
| 2020/0083727 | A1 | 3/2020 | Sun et al. | |
| 2020/0321796 | A1* | 10/2020 | Chang | H02M 1/10 |
| 2021/0296922 | A1* | 9/2021 | Sun | H02M 1/10 |

FOREIGN PATENT DOCUMENTS

| | | | | | |
|---|---|---|---|---|---|
| CN | 111355287 | A | * | 6/2020 | ............. B60L 53/22 |
| CN | 109889077 | B | * | 1/2021 | ............. B60L 53/22 |

\* cited by examiner

SINGLE-PHASE AND THREE-PHASE COMPATIBLE AC-DC CONVERSION CIRCUIT AND METHOD OF DETECTING INPUT CURRENT THEREOF

BACKGROUND

Technical Field

The present disclosure relates to an AC-DC conversion circuit and a method of detecting an input current thereof, and more particularly to a single-phase and three-phase compatible AC-DC conversion circuit and a method of detecting an input current thereof.

Description of Related Art

The statements in this section merely provide background information related to the present disclosure and do not necessarily constitute prior art.

In response to changes in the global environment, countries around the world have gradually attached importance to the concept of green energy and environmental protection. With the vigorous development of electrification and intelligent technology in recent years, various car manufacturers have also begun to actively develop electric vehicles (EV) to reduce carbon emissions. For electric vehicles, the on-board charger is the core, which is mainly responsible for transferring charging energy to the high-voltage battery. In addition, due to the continuous development of electric vehicles, the increasing battery mileage, and the increasing requirement of charging power, the original single-phase charger is gradually developed to three-phase charger. Considering that users may encounter different charging conditions, the single-phase and three-phase compatible on-board charger will bring more convenience to users.

Since too high or too low current at the input of the on-board will affect the life of the high-voltage battery inside the vehicle, whether the current detection loop at the input of the on-board charger can normally work is one of the key factors in the charging process of the high-voltage battery. In the current technology, before charging the high-voltage battery, a detection mechanism is added to the current detection loop to confirm whether the current loop can normally operate. However, before the battery is charged, no current will flow into the input terminal of the on-board charger, and it is impossible to confirm whether the current detection loop is properly functioning. Therefore, it is necessary to use a dummy load to form a current loop to test the function of the current detection loop. However, this method will increase the additional circuit cost.

SUMMARY

An object of the present disclosure is to provide a single-phase and three-phase compatible AC-DC conversion circuit with input current detection to solve the problems of existing technology.

In order to achieve the above-mentioned object, the single-phase and three-phase compatible AC-DC conversion circuit with input current detection is disposed between an AC side and a DC side. The AC side includes a three-phase power source. The AC-DC conversion circuit includes a first inductor, a second inductor, a third inductor, a switch bridge arm assembly, a fifth switching component, a pre-charge resistor, a capacitor assembly, and a control unit. The switch bridge arm assembly includes three switch bridge arms. Each of the switch bridge arms includes an upper switch and a lower switch connected in series. A plurality of common-connected nodes between the upper switches and the corresponding lower switches are respectively coupled to the three-phase power source through the first inductor, the second inductor, and the third inductor. The fifth switching component is coupled between a first phase of the three-phase power source and the common-connected node of the switch bridge arm corresponding to a third phase of the three-phase power source. The pre-charge resistor is coupled between the firth phase and the first inductor. The capacitor assembly is coupled to the switch bridge arm assembly in parallel to form the DC side. The control unit turns on at least one of the upper switches and at least one of the lower switches to provide a current detection loop having the first inductor and the third inductor. The control unit acquires a magnitude of a first current flowing through the first inductor and a magnitude of a third current flowing through the third inductor, and determines whether a current detection mechanism of the first current and the third current is normal.

Accordingly, the single-phase and three-phase compatible AC-DC conversion circuit having input current detection provides switching components to implement input single-phase voltage and three-phase voltage compatibility, and the state changes of the switching component may be used to cooperate with the circuit power switching components and the existing pre-charge resistor to generate the current detection loop to check whether the current sensing devices (such as current sensors) are normal, and therefore no additional components are needed, which can save the circuit cost and reduce the circuit size. In addition, there is no need to add additional circuit components, only the internal circuit power switch components of the on-board charger are used with the pre-charge resistor, and since the current detection loop includes pre-charge resistor, the current stress flowing through the components can be reduced.

Another object of the present disclosure is to provide a method of detecting an input current of a single-phase and three-phase compatible AC-DC conversion circuit to solve the problems of existing technology.

In order to achieve the above-mentioned object, the AC-DC conversion circuit receives an AC power source; the AC-DC conversion circuit includes a first inductor, a second inductor, a third inductor, three switch bridge arms, a pre-charge resistor, a fifth switching component, and a capacitor assembly; each of the switch bridge arms includes an upper switch and a lower switch connected in series, and a plurality of common-connected nodes between the upper switches and the corresponding lower switches are respectively coupled to the three-phase power source through the first inductor, the second inductor, and the third inductor. The method includes steps of: (a) using any one phase voltage of the AC power source or a capacitor voltage after the capacitor assembly is charged as a voltage source, (b) turning on the upper switch and the lower switch to provide a current detection loop comprising the first inductor and the third inductor, (c) acquiring a magnitude of a first current flowing through the first inductor and a magnitude of a third current flowing through the third inductor, and (d) determining whether a current detection mechanism of the first current and the third current is normal by comparing the first current and the third current.

Accordingly, the method of detecting the input current of the single-phase and three-phase compatible AC-DC conversion circuit provides switching components to implement input single-phase voltage and three-phase voltage compatibility, and the state changes of the switching component may be used to cooperate with the circuit power switching components and the existing pre-charge resistor to generate the current detection loop to check whether the current sensing devices (such as current sensors) are normal, and therefore no additional components are needed, which can save the circuit cost and reduce the circuit size. In addition, there is no need to add additional circuit components, only the internal circuit power switch components of the on-board charger are used with the pre-charge resistor, and since the current detection loop includes pre-charge resistor, the current stress flowing through the components can be reduced.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
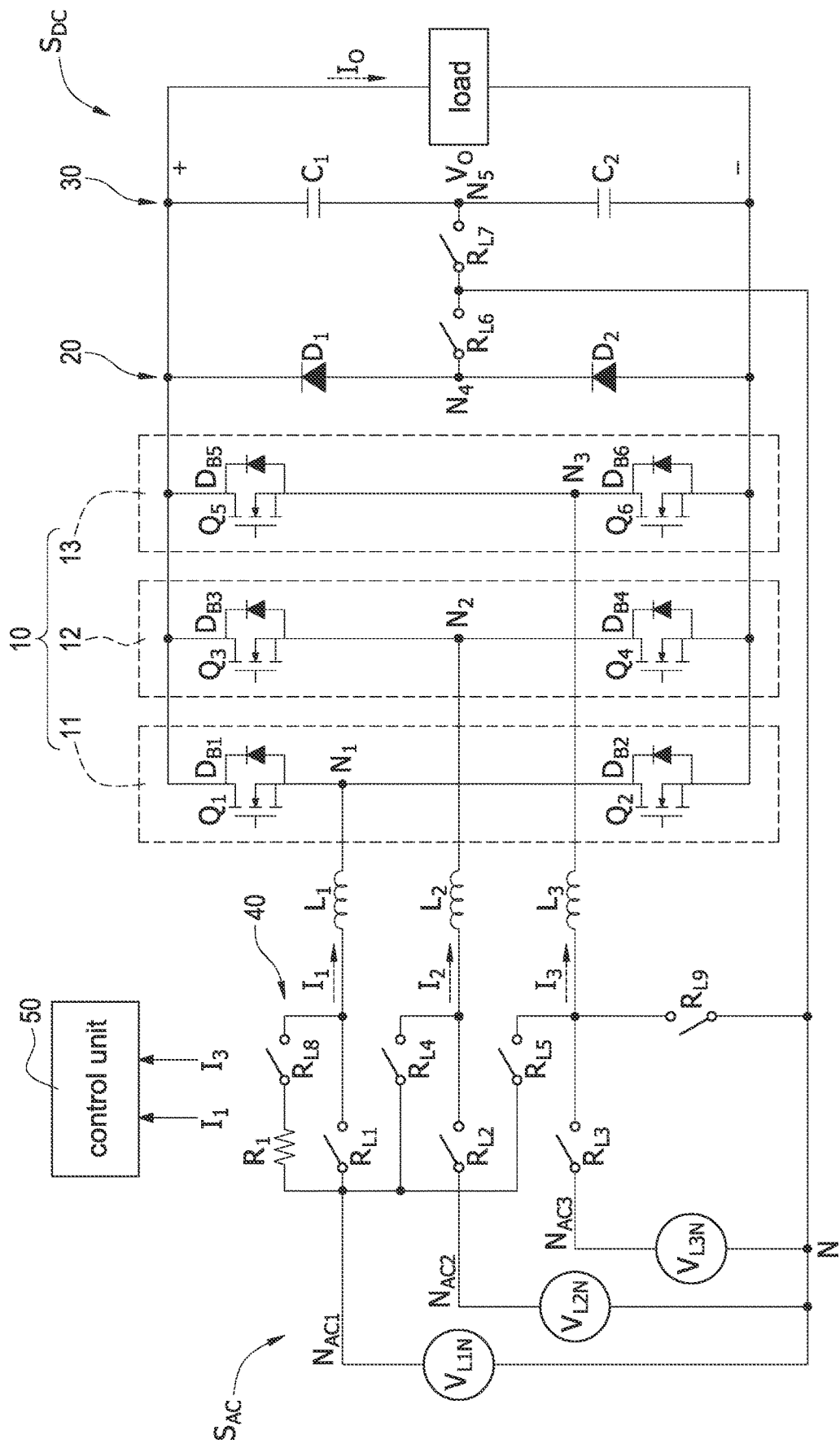
FIG. 1 is a circuit diagram of a single-phase and three-phase compatible AC-DC conversion circuit with input current detection according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a circuit diagram of a single-phase and three-phase compatible AC-DC conversion circuit with input current detection according to the present disclosure. The AC-DC conversion circuit is disposed between the AC side $S_{AC}$ and the DC side $S_{DC}$. The AC side $S_{AC}$ provides an AC power source, for example a three-phase AC power source or a single-phase AC power source, and the detailed description will be made as follows. In different embodiments, the single-phase and three-phase compatible AC-DC conversion circuit of the present disclosure is, for example but not limited to, a bidirectional AC-DC conversion circuit.

Since the AC side $S_{AC}$ can provide the three-phase AC power source or the single-phase AC power source, the AC side $S_{AC}$ has a first AC node $N_{AC1}$, a second AC node $N_{AC2}$, a third AC node $N_{AC3}$, and a neutral node N. Take the three-phase AC power source as an example, a first phase voltage $V_{L1N}$ of the three-phase AC power source is disposed between the first AC node $N_{AC1}$ and the neutral node N, a second phase voltage $V_{L2N}$ of the three-phase AC power source is disposed between the second AC node $N_{AC2}$ and the neutral node N, and a third phase voltage $V_{L3N}$ of the three-phase AC power source is disposed between the third AC node $N_{AC3}$ and the neutral node N.

The AC-DC conversion circuit includes a switch bridge arm assembly 10, a fourth switching component $RL_4$, a fifth switching component $RL_5$, a ninth switching component $RL_9$, a pre-charge resistor $R_1$, a diode bridge arm 20, a capacitor assembly 30, a current sensor 40, and a control unit 50.

The switch bridge arm assembly 10 includes three switch bridge arms connected in parallel, including a first switch bridge arm 11, a second switch bridge arm 12, and a third switch bridge arm 13. The first switch bridge arm 11 includes a first switch $Q_1$ and a second switch $Q_2$ connected at a first node $N_1$, and the first node $N_1$ is coupled to a first AC node $N_{AC1}$ through a first switching component $RL_1$. When the first switching component $RL_1$ is turned on, the first node $N_1$ is coupled to a first phase voltage $V_{L1N}$ through a first phase inductor $L_1$. The second switch bridge arm 12 includes a third switch $Q_3$ and a fourth switch $Q_4$ connected at a second node $N_2$, and the second node $N_2$ is coupled to a second AC node $N_{AC2}$ through a second switching component $RL_2$. When the second switching component $RL_2$ is turned on, the second node $N_2$ is coupled to a second phase voltage $V_{L2N}$ through a second phase inductor $L_2$. The third switch bridge arm 13 includes a fifth switch $Q_5$ and a sixth switch $Q_6$ connected at a third node $N_3$, and the third node $N_3$ is coupled to a third AC node $N_{AC3}$ through a third switching component $RL_3$. When the third switching component $RL_3$ is turned on, the third node $N_3$ is coupled to a third phase voltage $V_{L3N}$ through a third phase inductor $L_3$.

The fourth switching component $RL_4$ is coupled between the first AC node $N_{AC1}$ and the second node $N_2$. That is, when the fourth switching component $RL_4$ is turned on, the fourth switching component $RL_4$ is connected across between a first phase loop and a second phase loop of the three-phase power source. The fifth switching component $RL_5$ is coupled between the first AC node $N_{AC1}$ and the third node $N_3$. That is, when the fifth switching component $RL_5$ is turned on, the fifth switching component $RL_5$ is connected across between the first phase loop and a third phase loop of the three-phase power source. The ninth switching component $RL_9$ is coupled between the third switching component $RL_3$, the third AC node $N_{AC3}$, and the neutral node N for bidirectional operation of AC-DC conversion circuit. In particular, each of the above-mentioned switching components may be implemented by using a relay.

The pre-charge resistor $R_1$ is coupled to the first switching component $RL_1$ in parallel. When an electric vehicle is charging, the AC-DC conversion circuit converts the three-phase or single-phase AC power source of the AC side $S_{AC}$ to a DC power source outputted at the DC side $S_{DC}$ for charging the electric vehicle. Therefore, the pre-charge resistor $R_1$ is used to suppress a large current, such as an inrush current at the beginning of the charging process, such as when the user starts charging an electric vehicle.

The diode bridge arm 20 is coupled to the switch bridge arm assembly 10 in parallel. In one embodiment, the diode bridge arm 20 includes a first diode $D_1$ and a second diode $D_2$ connected in series at a fourth node $N_4$. In different current-withstanding applications, each diode of the diode bridge arm 20 may also use multiple diodes in parallel, so the diode bridge arm 20 shown in FIG. 1 is not limited.

The capacitor assembly 30 is coupled to the diode bridge arm 20 in parallel to form the DC side $S_{DC}$. In one embodiment, the capacitor assembly 30 includes a first capacitor $C_1$ and a second capacitor $C_2$ connected in series at a fifth node $N_5$. In the application of charging the electric vehicle, the capacitor assembly 30 is used to store the DC power source acquired by converting the three-phase or single-phase AC power source by the AC-DC conversion circuit so that the DC power source outputted from the DC side $S_{DC}$ is used by next stage conversion circuit for charging the battery of the electric vehicle.

In one embodiment, the current sensor 40 is copulated to at least the first phase inductor $L_1$ and the third phase inductor $L_3$ for sensing a first current $I_1$ flowing through the first phase inductor $L_1$ and sensing a third current $I_3$ flowing through the third phase inductor $L_3$. In one embodiment, the current sensor 40 is, for example, but not limited to, a Hall sensor. The control unit 50 receives current detection signals corresponding to the first current $I_1$ and the third current $I_3$ to determine whether a current detection loop is normal.

Figure 2:
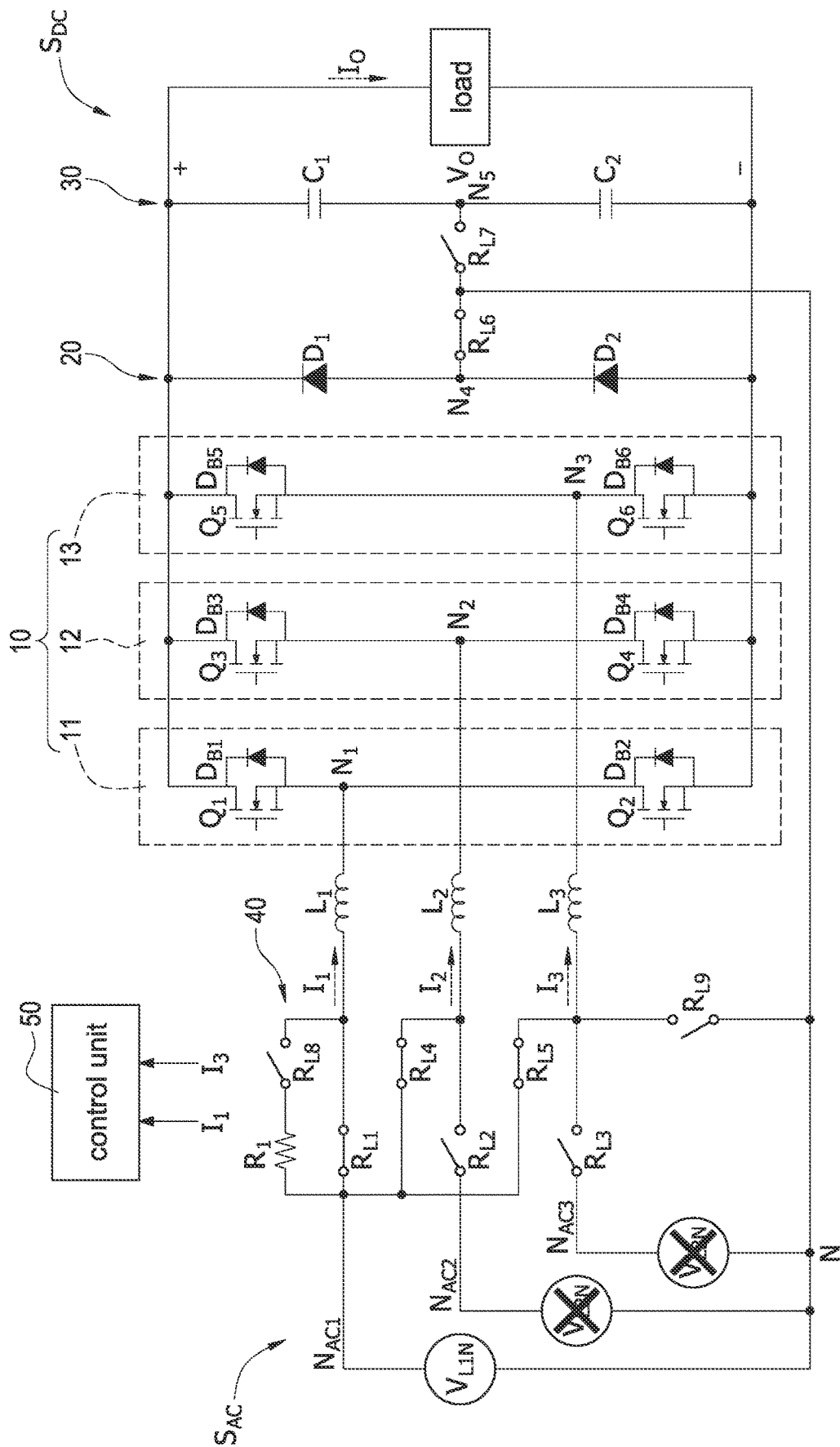
FIG. 2 is a circuit diagram of the single-phase and three-phase compatible AC-DC conversion circuit operating under a single-phase charging according to the present disclosure.

In addition, the AC-DC conversion circuit further includes a sixth switching component $RL_6$ and a seventh switching component $RL_7$. A first end of the sixth switching component $RL_6$ is coupled to the diode bridge arm 20, and a second end of the sixth switching component $RL_6$ is coupled to the seventh switching component $RL_7$ at the neutral node N. In response to the single-phase and three-phase compatible function, the sixth switching component $RL_6$ and the seventh switching component $RL_7$ are respectively used for single-phase and three-phase power supply control. That is, when the AC side $S_{AC}$ is single-phase power supply, the sixth switching component $RL_6$ is controlled to be turned on (refer to FIG. 2), or when the AC side $S_{AC}$ is three-phase power supply, the seventh switching component $RL_7$ is controlled to be turned on (refer to FIG. 3), and the detailed description will be made as follows.

In addition, the AC-DC conversion circuit further includes further an eighth switching component $RL_8$. The eighth switching component $RL_8$ is coupled to the pre-charge resistor $R_1$ in series to form a series-connected structure, and the series-connected structure is coupled to the first switching component $RL_1$ in parallel. By using the eighth switching component $RL_8$, the pre-charge resistor $R_1$ can be reliably disconnected. However, the eighth switching component $RL_8$ may also be omitted.

Therefore, technical feature of the present disclosure is that under the no-load condition, no additional circuit components are required, and only the internal circuit power switching components of the on-board charger are used with pre-charge resistor $R_1$ to detect whether the function of the current detection loop is normal.

When the on-board charger operates, it can be divided into single-phase and three-phase circuit operations according to the conditions of the input terminal of the charging pile. Please refer to FIG. 2, which shows a circuit diagram of the single-phase and three-phase compatible AC-DC conversion circuit operating under a single-phase charging according to the present disclosure. When the AC input is the single-phase voltage, only two terminals of the AC input will provide power. Take the first phase voltage $V_{L1N}$ as the supply voltage as an example, the first switching component $RL_1$, the fourth switching component $RL_4$, the fifth switching component $RL_5$, and the sixth switching component $RL_6$ are turned on (the remaining switching components are turned off), and therefore the first phase voltage $V_{L1N}$ passes through the AC-DC conversion circuit, and each switch bridge arm of the switch bridge arm assembly 10 and the diode bridge arm 20 form a totem pole PFC (power factor correction) circuit to transfer energy. Although the AC input is a single-phase voltage, by turning on the fourth switch component $RL_4$ and the fifth switching component $RL_5$, three sets of parallel switching bridge arms of the switch bridge arm assembly 10 (that is, the first switch bridge arm 11, the second switch bridge arm 12, and the third switch bridge arm 13) are commonly coupled to the first phase voltage $V_{L1N}$. The three sets of parallel switch bridge arms all participate in the operation of pulse width modulation (PWM) control, and the parallel bridge arms further operate in the interleaved control, thereby avoiding idle bridge arms and increasing output power. In particular, the fifth switching component $RL_5$ can be omitted depending on the actual power demand. In other words, the third switch bridge arm 13 may not be involved in the operation. In particular, the first, second, and third of the three-phase descriptions in the present disclosure are only for the convenience of illustration, and do not represent a specific phase corresponding to the three-phase power system.

Figure 3:
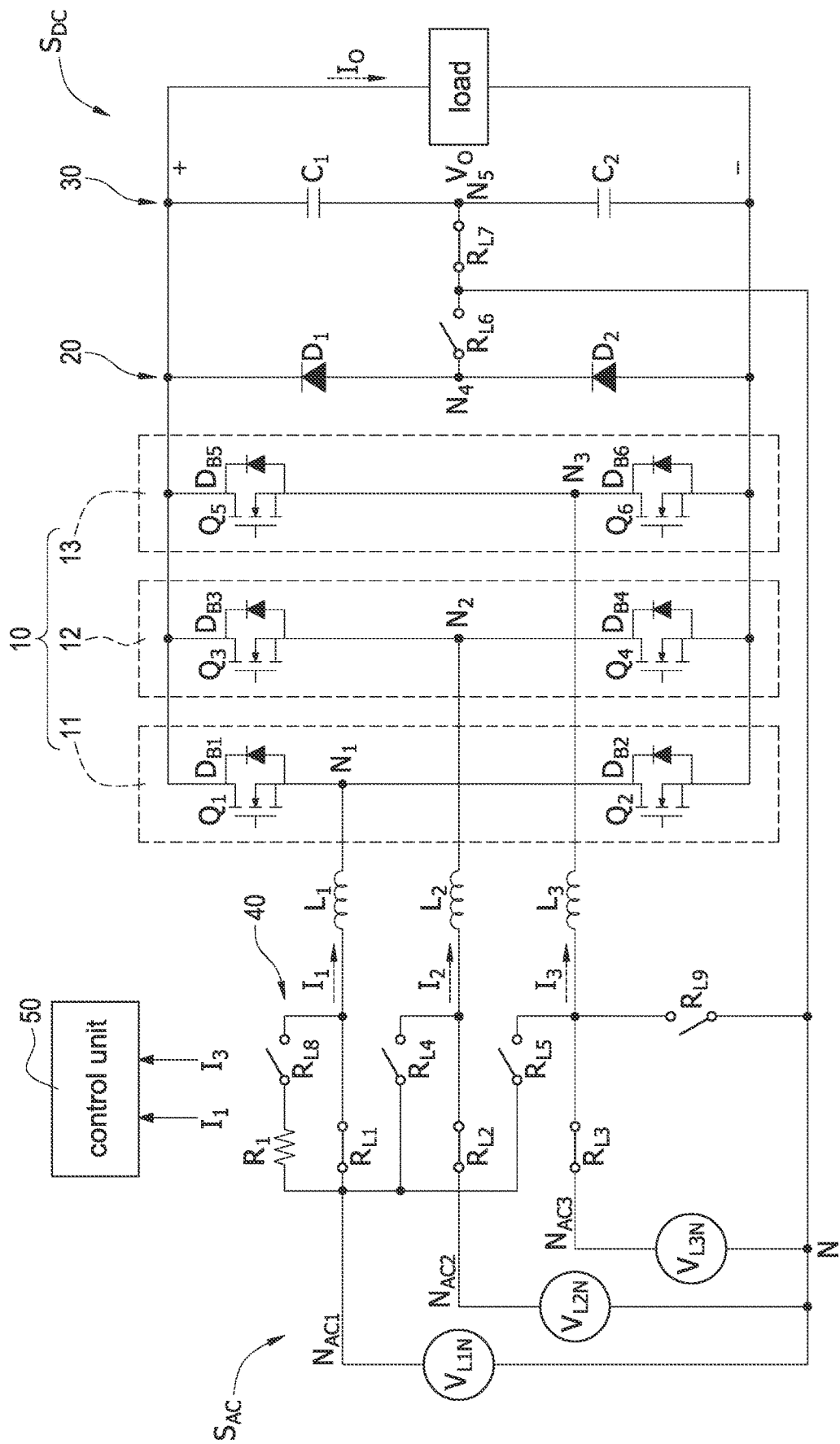
FIG. 3 is a circuit diagram of the single-phase and three-phase compatible AC-DC conversion circuit operating under a three-phase charging according to the present disclosure.

Please refer to FIG. 3, which shows a circuit diagram of the single-phase and three-phase compatible AC-DC conversion circuit operating under a three-phase charging according to the present disclosure. When the AC input is the three-phase voltage, the first switching component $RL_1$, the second switching component $RL_2$, the third switching component $RL_3$, and the seventh switching component $RL_7$ are turned on (the rest of the switching components are turned off). At this condition, the first phase voltage $V_{L1N}$, the second phase voltage $V_{L2N}$, and the third phase voltage $V_{L3N}$ supply power through the AC-DC conversion circuit, and the switch bridge arm assembly 10 and the capacitor assembly 30 form a circuit topology of a half bridge PFC to implement the function of energy transfer.

Regardless of whether the AC input is a single-phase or three-phase circuit operation, before the on-board charger operates, there is no energy stored in the power capacitors (i.e., the first capacitor $C_1$ and the second capacitor $C_2$ of the capacitor assembly 30). At this condition, the on-board charger is in a no-load condition, that is, the output current is zero, so there is no fixed current to detect whether the current detection loop is normal. As mentioned above, the internal circuit power switch components of the on-board charger are used with the pre-charge resistor $R_1$ to implement the function of charging and discharging so as to accurately measure the current and confirm whether the current detection loop normally operates.

The present disclosure provides two embodiments to realize whether the function of the current detection loop is normal. The first one is: the AC input source first charges the capacitor assembly 30, and after a capacitor voltage of the capacitor assembly 30 is built, the capacitor voltage is used as a voltage source to discharge so as to determine whether the current detection loop is normal by a current flowing through the pre-charge resistor $R_1$. The second one is: the AC input power is used as a voltage source so as to determine whether the current detection loop is normal by a current flowing through the pre-charge resistor $R_1$. The following two embodiments will be described respectively in cooperation with the drawings (wherein FIG. 4 to FIG. 6 correspond to the first embodiment, and FIG. 7 to FIG. 12 correspond to the second embodiment).

The First Embodiment

First, before the on-board charger starts to operate, the first phase voltage $V_{L1N}$, all switching components return to disconnected (turned-off) state, as shown in FIG. 1.

Figure 4:
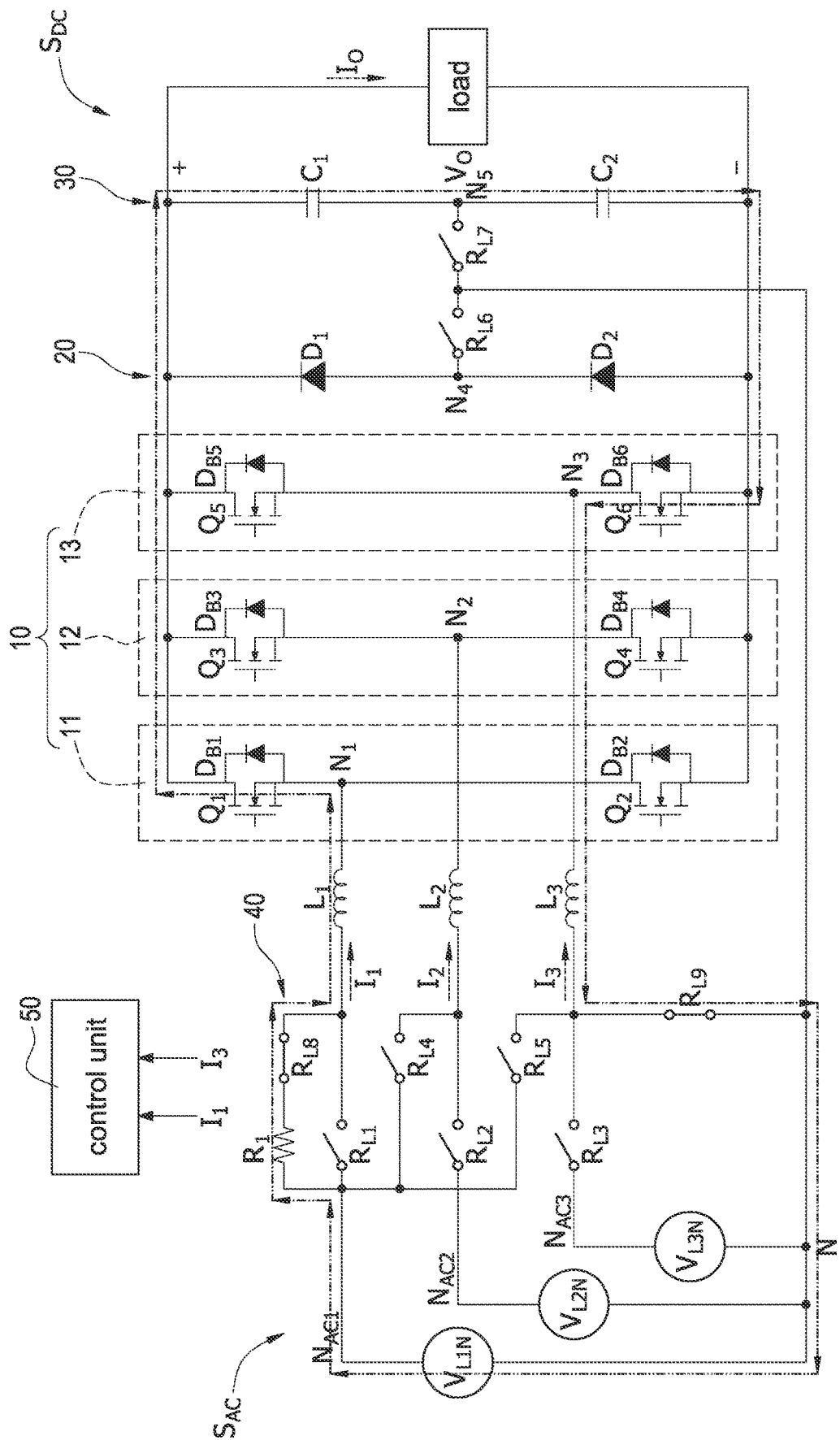
FIG. 4 is a circuit diagram of charging a capacitor assembly by a phase voltage of the AC-DC conversion circuit in a positive-half cycle according to the present disclosure.
Figure 5:
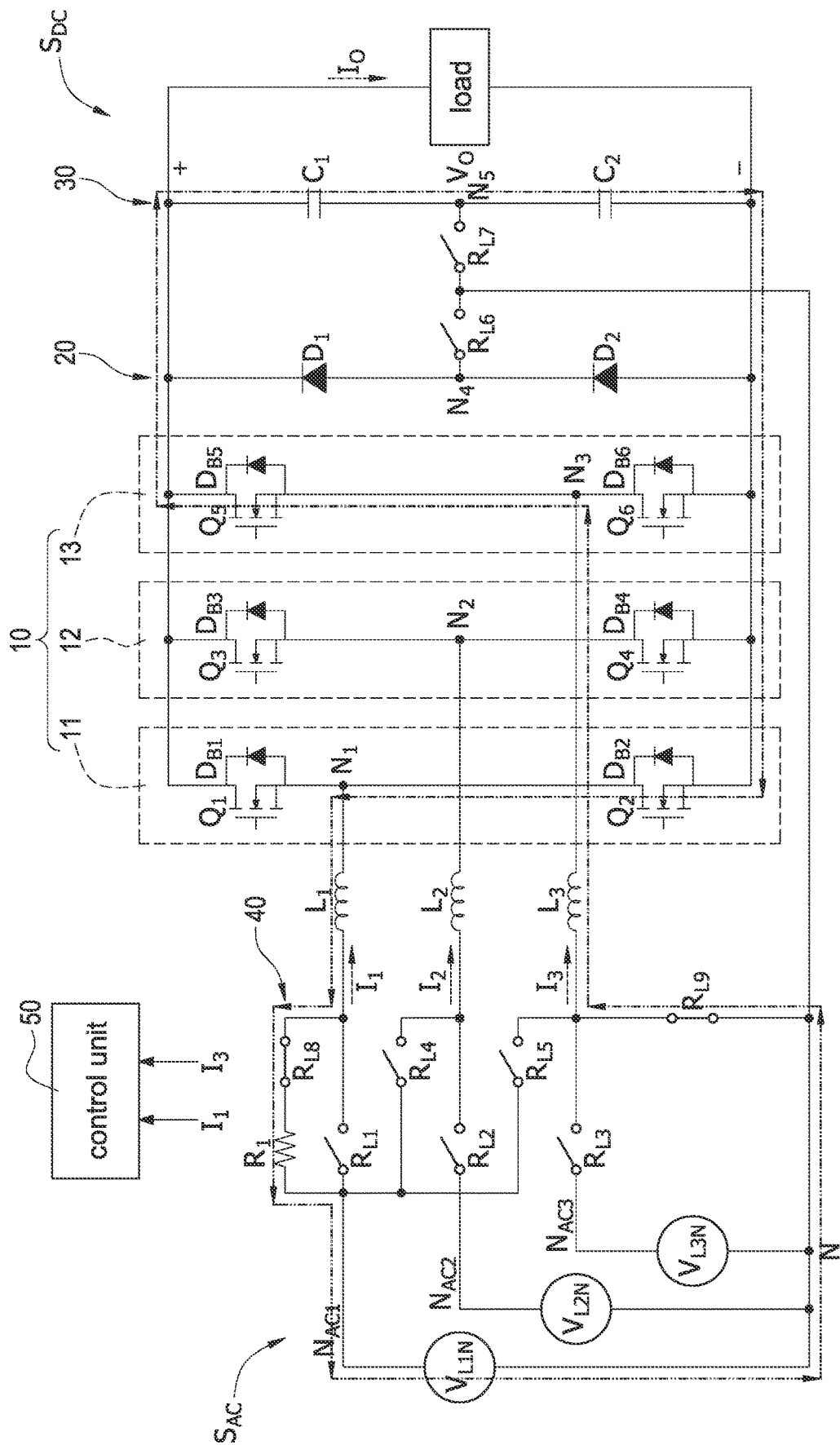
FIG. 5 is a circuit diagram of charging the capacitor assembly by the phase voltage of the AC-DC conversion circuit in a negative-half cycle according to the present disclosure.

Afterward, an energy-charging path of the first capacitor $C_1$ and the second capacitor $C_2$ is built. Please refer to FIG. 4 and FIG. 5, which show circuit diagrams of charging a capacitor assembly by a phase voltage of the AC-DC conversion circuit in a positive-half cycle and a negative-half cycle according to the present disclosure, respectively. As shown in FIG. 4, when the ninth switching component $RL_9$ is turned on, the first phase voltage $V_{L1N}$ in the positive-half cycle charges the capacitor assembly 30 through a positive-half cycle charging path composed of the pre-charge resistor $R_1$, a body diode $D_{B1}$ of the first switch $Q_1$, the capacitor assembly 30, a body diode $D_{B6}$ of the sixth switch $Q_6$, and the ninth switching component $RL_9$. As shown in FIG. 5, when the ninth switching component $RL_9$ is turned on, the first phase voltage $V_{L1N}$ in the negative-half cycle charges the capacitor assembly 30 through a negative-half cycle charging path composed of the ninth switching component $RL_9$, a body diode $D_{B5}$ of the fifth switch $Q_5$, the capacitor assembly 30, a body diode $D_{B2}$ of the second switch $Q_2$, and the pre-charge resistor $R_1$. Incidentally, the energy charging path for the first capacitor $C_1$ and the second capacitor $C_2$ is not limited to the manners shown in FIG. 4 and FIG. 5. For example, it is also possible to turn on the sixth switching component $RL_6$ but not the ninth switching component $RL_9$, and cooperate with the diode bridge arm 20 to form a charging path, as long as the capacitor assembly 30 can be charged.

Figure 6:
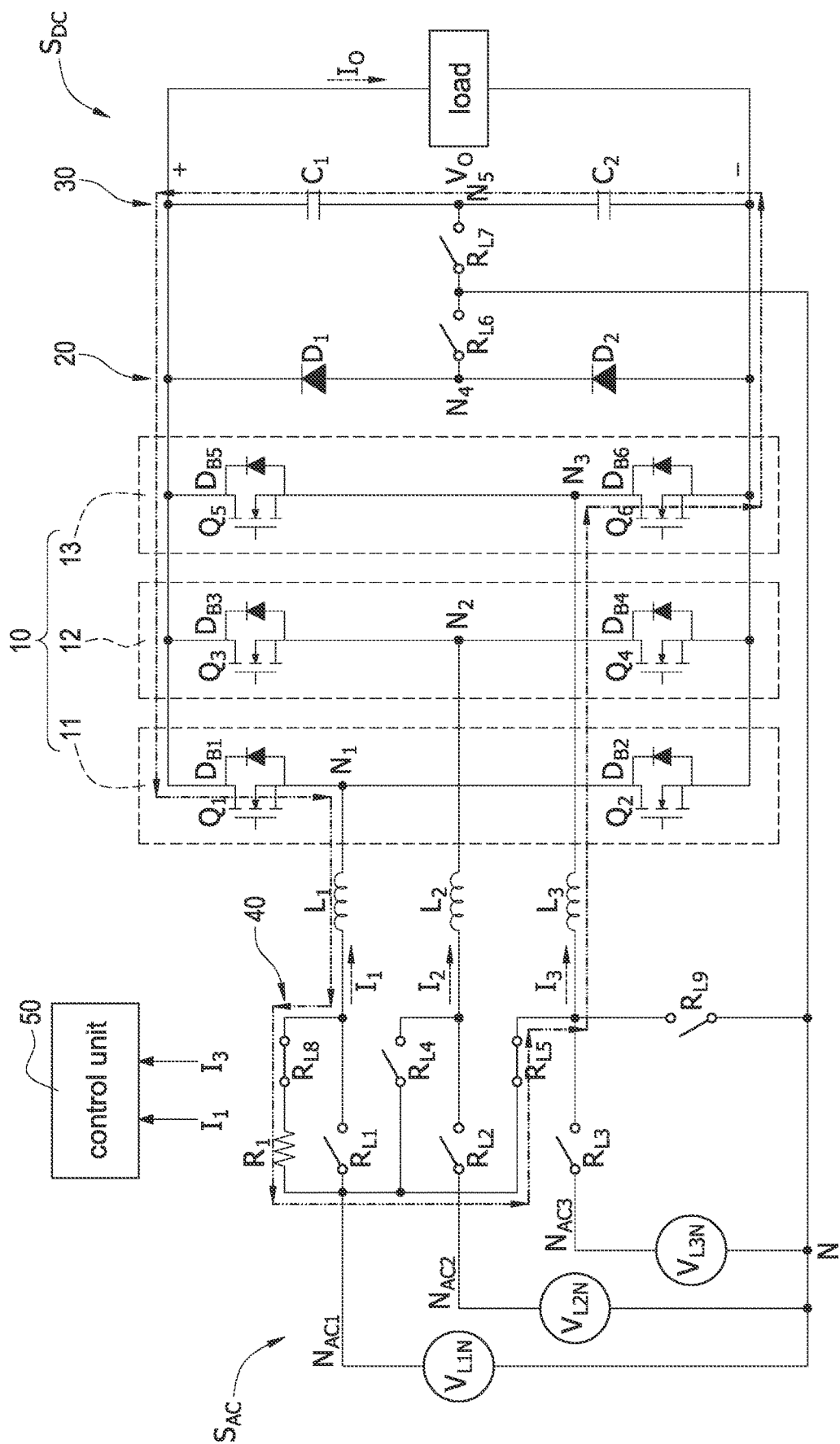
FIG. 6 is a circuit diagram of discharging the capacitor assembly to generate a detection circuit according to the present disclosure.

Afterward, within a predetermined time, the first capacitor $C_1$ and the second capacitor $C_2$ are charged until the output voltage Vo reaches the peak value of the first phase voltage $V_{L1N}$. Next, change the state of the switching components, as shown in FIG. 6, which shows a circuit diagram of discharging the capacitor assembly to generate a detection circuit according to the present disclosure. At this condition, the fifth switching component $RL_5$ is turned on, the capacitor voltage discharges through a discharging path composed of the capacitor assembly 30, the first switch $Q_1$, the pre-charge resistor $R_1$, the fifth switching component $RL_5$, and the sixth switching component $RL_6$. Afterward, the active switch modulation manner is activated. At this condition, the first switch $Q_1$ and the sixth switch $Q_6$ are turned on, and the duty cycle of the first switch $Q_1$ and the duty cycle of the sixth switch $Q_6$ are control by pulse width modulation (PWM) control so that the first capacitor $C_1$ and the second capacitor $C_2$ discharge through the pre-charge resistor $R_1$. Therefore, the current periodically rises and falls with the turned-on and turned-off of the power switching components. During the discharging process, the control unit 50 determines a current detection mechanism of the first current $I_1$ and the third current $I_3$ is normal, and the accuracy of the sensed current values of the first current $I_1$ and the third current $I_3$ according to a difference between the first current $I_1$ and the third current $I_3$, or according to the comparison of an arithmetic mean value of the first current $I_1$ and the third current $I_3$ with a preset reference current value. Since the resistance value of the pre-charge resistor $R_1$ is known, the control unit 50 first sets a preset reference current value and compares an average value of the sensed current for a predetermined time with the preset reference current value to determine whether the sensed value is correct. Further, since the current on the loop should be the same, a current difference between the first current $I_1$ and the third current $I_3$ can also be used to confirm whether the sensors are abnormal. That is, as long as there is a significant current difference between the two current sensed by the corresponding sensors, it means that at least one of the sensors is abnormal.

Incidentally, the first switch $Q_1$, the fourth switch $Q_4$, and the fourth switching component $RL_4$ are switched to be turned on to detect a current detection loop flowing the first current $I_1$ and the second current $I_2$, and the rest operations are the same.

Finally, when the current detection loop completely checks, all the switching components are switched to be turned off, and therefore states of the switches and switching components the entire circuit are as shown in FIG. 1. Afterward, the on-board charger starts to normally operate. The advantage of this embodiment is that the capacitor assembly 30 is already charged during the current detection process, which can shorten the pre-charge time for the normal operation of the on-board charger.

The Second Embodiment

First, before the on-board charger starts to operate, the first phase voltage $V_{L1N}$, all switching components return to disconnected (turned-off) state, as shown in FIG. 1.

Afterward, the ninth switching component $RL_9$ is turned on to build a current path. Please refer to FIG. 7 to FIG. 9, which show a waveform diagram of drive signals of switching components in the positive-half cycle and circuit diagrams of switching components corresponding to different drive control signals in the positive-half cycle according to the present disclosure.

Figure 7:
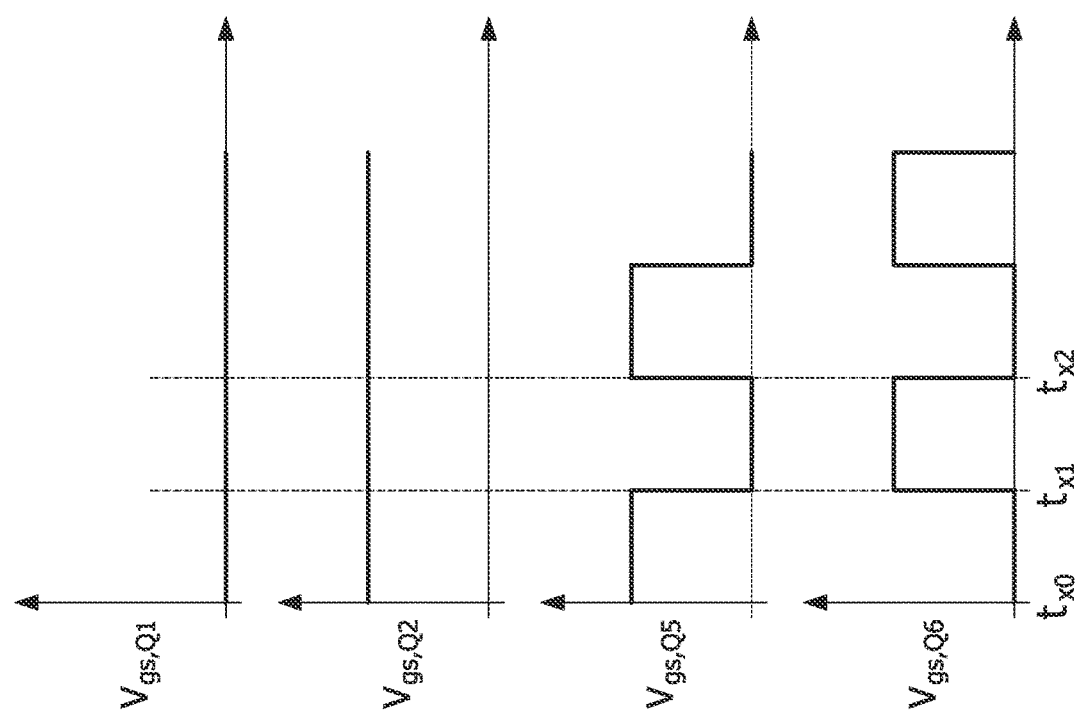
FIG. 7 is a waveform diagram of drive signals of switching components in the positive-half cycle according to the present disclosure.
Figure 8:
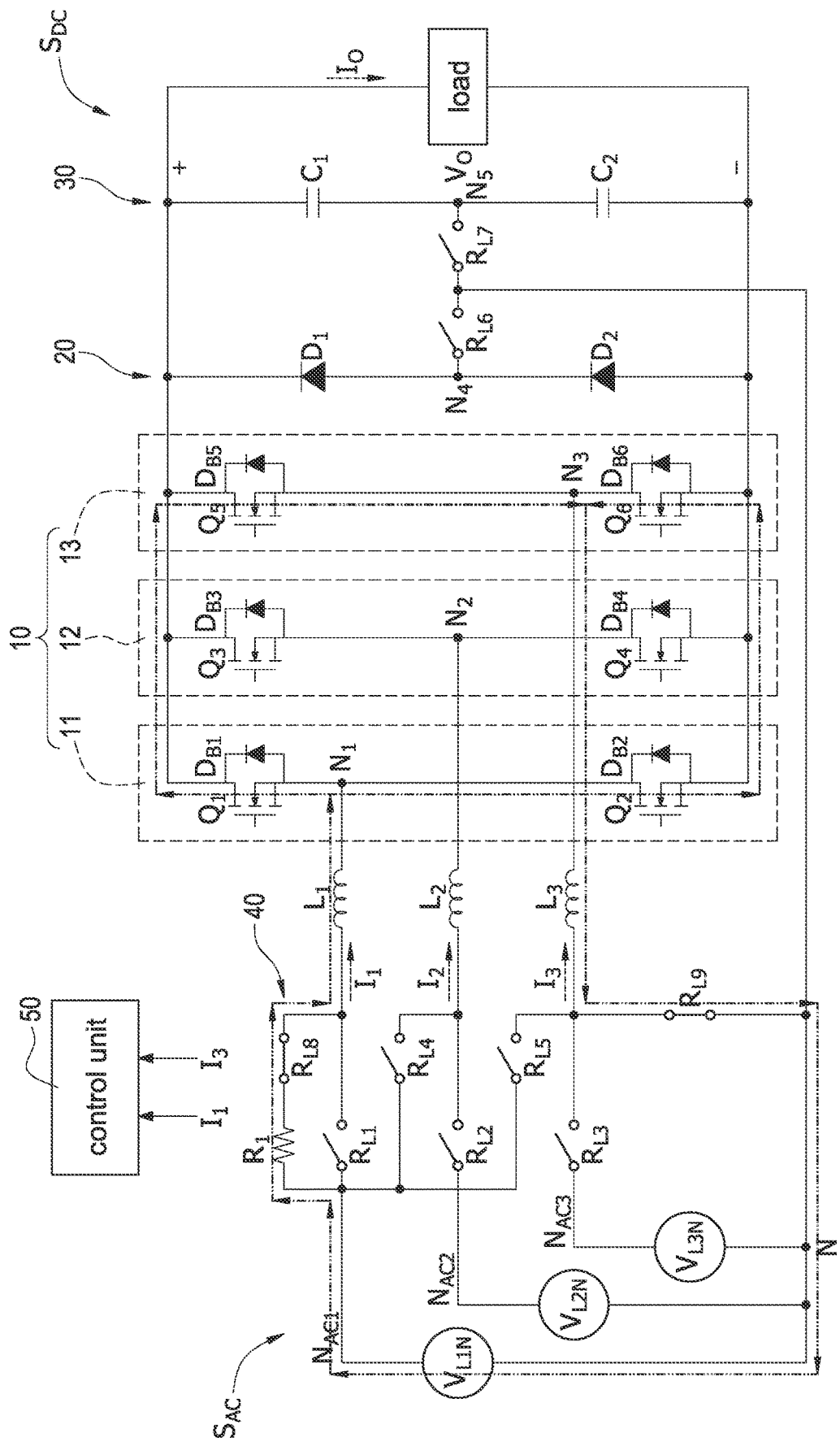
FIG. 8 and FIG. 9 are circuit diagrams of switching components corresponding to different drive control signals in the positive-half cycle according to the present disclosure.
Figure 9:
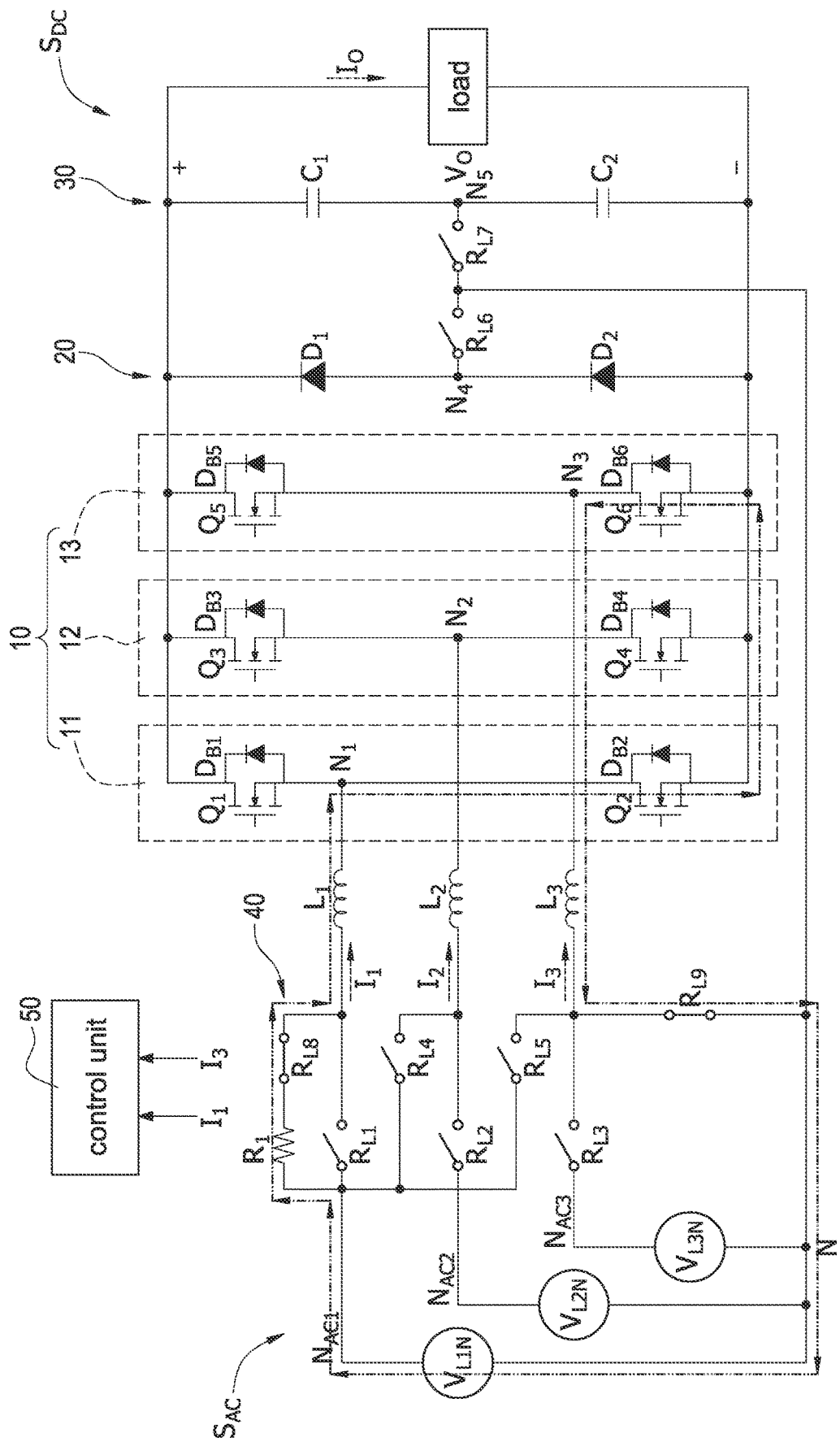

As shown in FIG. 7, a drive signal $V_{gs,\,Q1}$ of the first switch $Q_1$ is low-level, a drive signal $V_{gs,\,Q2}$ of the second switch $Q_2$ is high-level, a drive signal $V_{gs,\,Q5}$ of the fifth switch $Q_5$ and a drive signal $V_{gs,\,Q6}$ of the sixth switch $Q_6$ are complementary, and a duty cycle thereof is, for example, but not limited to, 50%. During the interval between $t_{x0}$ and $t_{x1}$, as shown in FIG. 8, the first switch $Q_1$ is turned off, the second switch $Q_2$ is turned on, the fifth switch $Q_5$ is turned on, the sixth switch $Q_6$ is turned off, the first phase voltage $V_{L1N}$ in the positive-half cycle passes through the pre-charge resistor $R_1$, the body diode $D_{B1}$ of the first switch $Q_1$, the fifth switch $Q_5$, and the ninth switching component $RL_9$, and passes through the pre-charge resistor $R_1$, the second switch $Q_2$, the body diode $D_{B6}$ of the sixth switch $Q_6$, and the ninth switching component $RL_9$ to generate the first current $I_1$ flowing through the first phase inductor $L_1$ and the third current $I_3$ flowing through the third phase inductor $L_3$. During the interval between $t_{x1}$ and $t_{x2}$, as shown in FIG. 9, the first switch $Q_1$ is turned off, the second switch $Q_2$ is turned on, the fifth switch $Q_5$ is turned off, the sixth switch $Q_6$ is turned on, the first phase voltage $V_{L1N}$ in the positive-half cycle passes through the pre-charge resistor $R_1$, the second switch $Q_2$, the sixth switch $Q_6$, and the ninth switching component $RL_9$ to generate the first current $I_1$ flowing through the first phase inductor $L_1$ and the third current $I_3$ flowing through the third phase inductor $L_3$.

Figure 10:
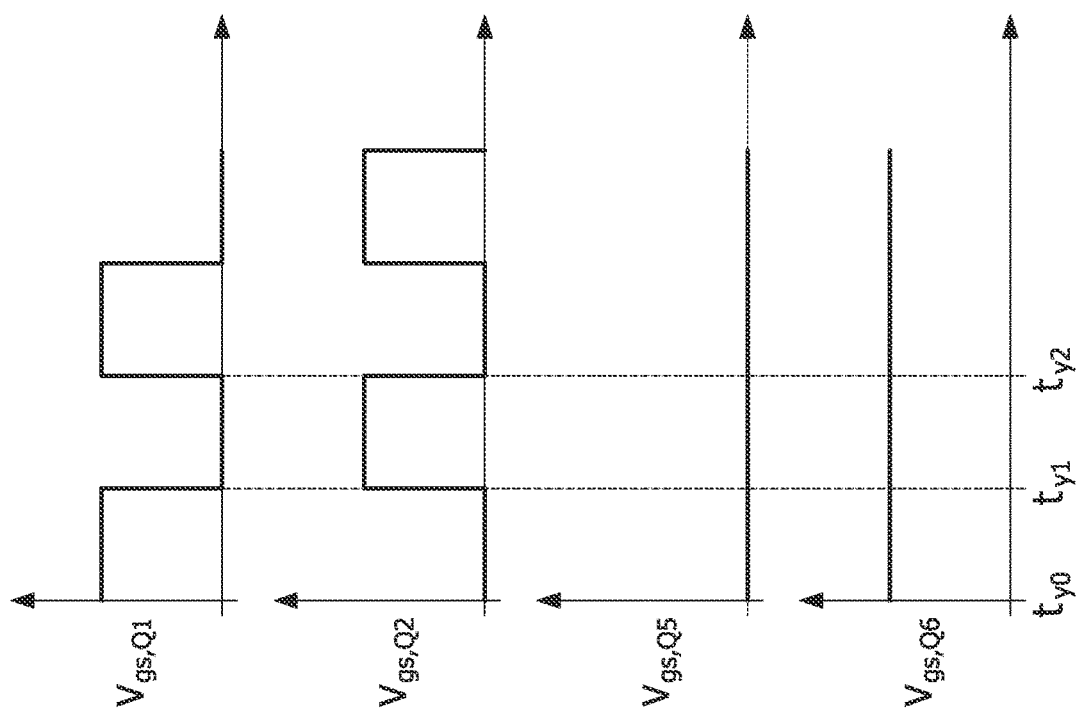
FIG. 10 is a waveform diagram of drive signals of switching components in the negative-half cycle according to the present disclosure.
Figure 11:
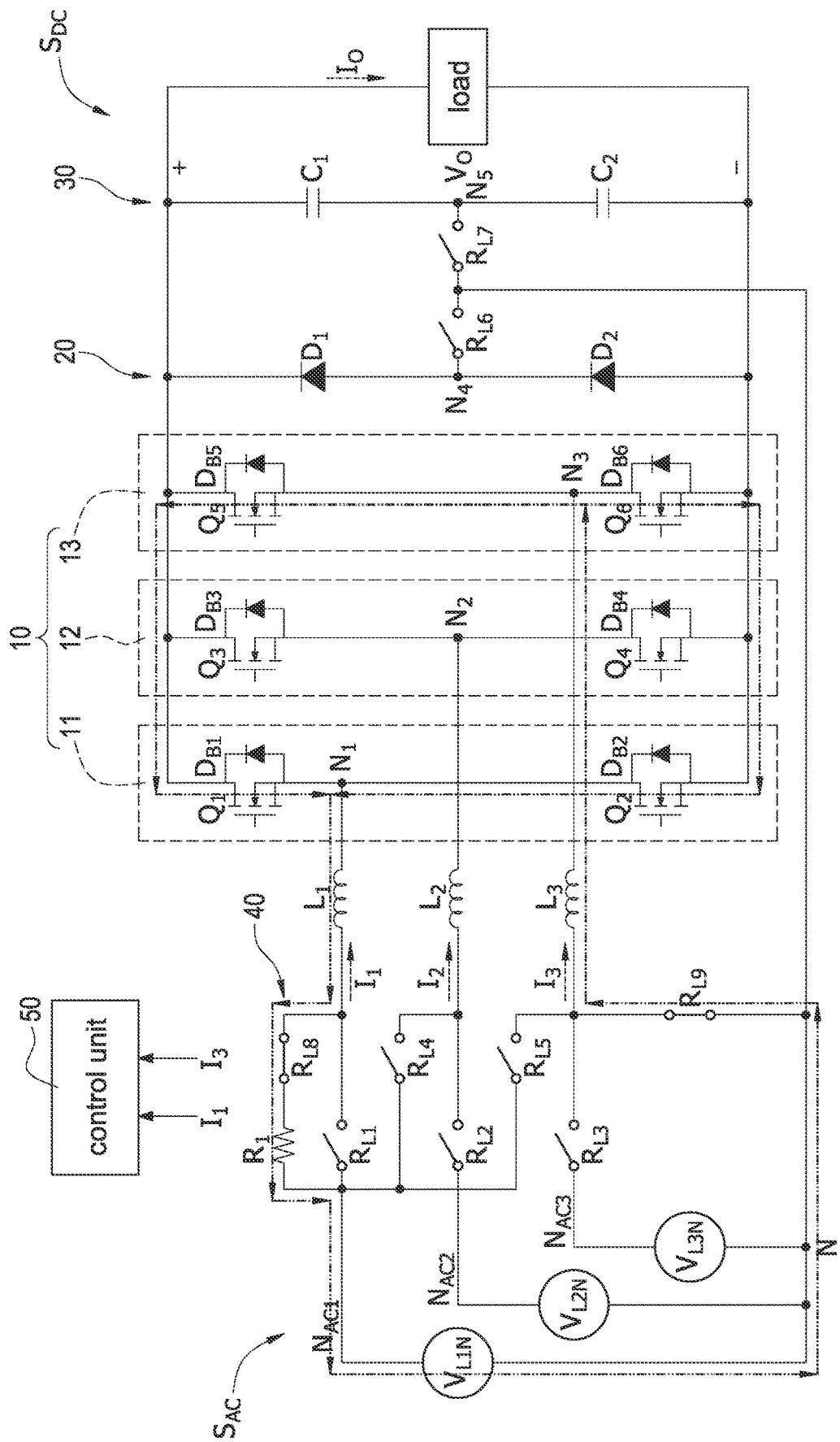
FIG. 11 and FIG. 12 are circuit diagrams of switching components corresponding to different drive control signals in the negative-half cycle according to the present disclosure.
Figure 12:
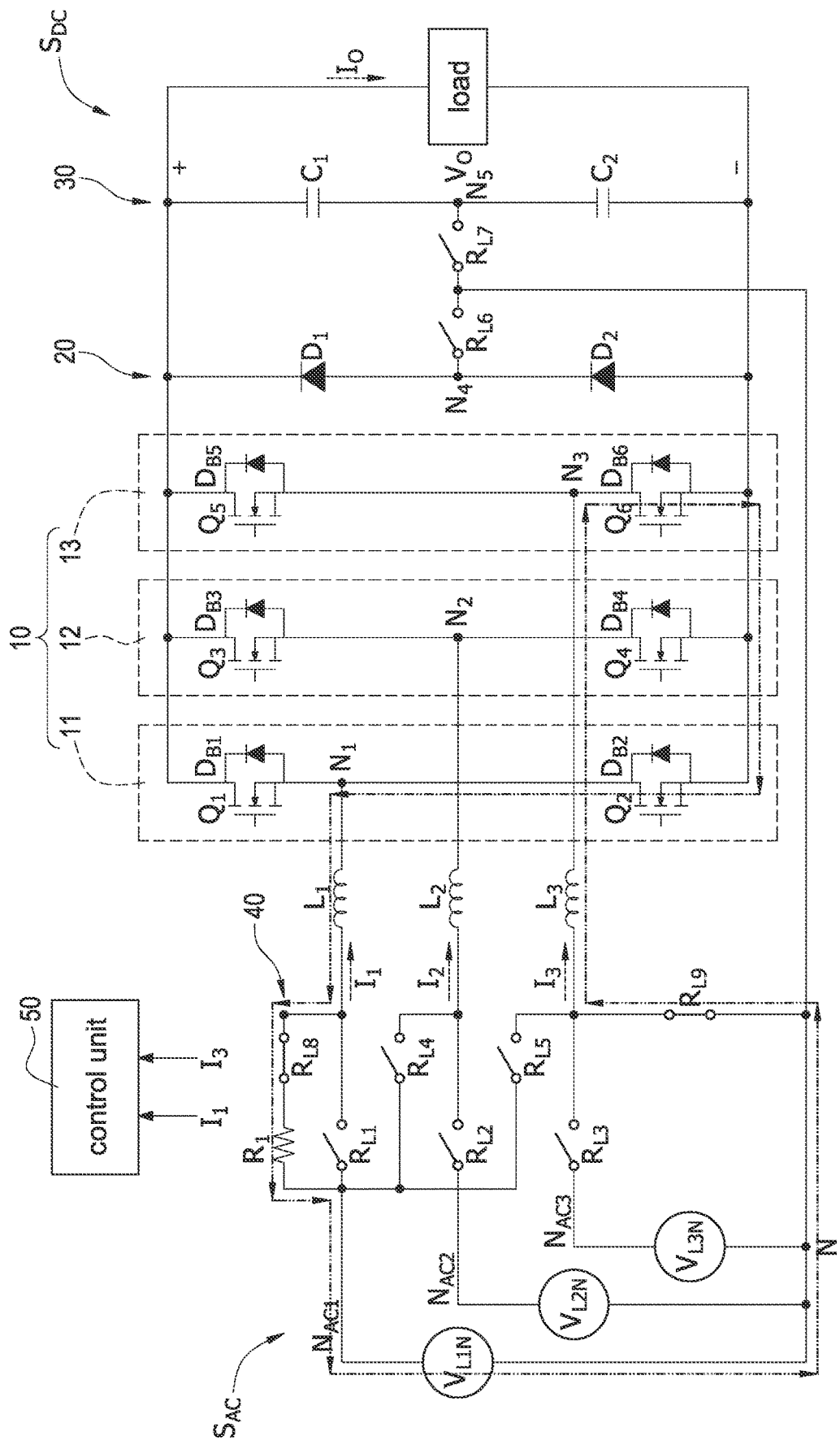

Please refer to FIG. 10 to FIG. 12, which show a waveform diagram of drive signals of switching components in the negative-half cycle and circuit diagrams of switching components corresponding to different drive control signals in the negative-half cycle according to the present disclosure. As shown in FIG. 10, the drive signal $V_{gs, Q5}$ of the fifth switch $Q_5$ is low-level, the drive signal $V_{gs, Q6}$ of the sixth switch $Q_6$ is high-level, the drive signal $V_{gs, Q1}$ of the first switch $Q_1$ and the drive signal $V_{gs, Q2}$ of the second switch $Q_2$ are complementary, and a duty cycle thereof is, for example, but not limited to, 50%. During the interval between $t_{y0}$ and $t_{y1}$, as shown in FIG. 11, the fifth switch $Q_5$ is turned off, the sixth switch $Q_6$ is turned on, the first switch $Q_1$ is turned on, the second switch $Q_2$ is turned off, the first phase voltage $V_{L1N}$ in the negative-half cycle passes through the ninth switching component $RL_9$, the sixth switch $Q_6$, the body diode $D_{B2}$ of the second switch $Q_2$, and the pre-charge resistor $R_1$, and passes through the ninth switching component $RL_9$, the body diode $D_{B5}$ of the fifth switch $Q_5$, the first switch $Q_1$, and the pre-charge resistor $R_1$ to generate the first current $I_1$ flowing through the first phase inductor $L_1$ and the third current $I_3$ flowing through the third phase inductor $L_3$.

During the interval between $t_{y1}$ and $t_{y2}$, as shown in FIG. 12, the fifth switch $Q_5$ is turned off, the sixth switch $Q_6$ is turned on, the first switch $Q_1$ is turned off, the second switch $Q_2$ is turned on, the first phase voltage $V_{L1N}$ in the negative-half cycle passes through the ninth switching component $RL_9$, the sixth switch $Q_6$, and the pre-charge resistor $R_1$ to generate the first current $I_1$ flowing through the first phase inductor $L_1$ and the third current $I_3$ flowing through the third phase inductor $L_3$. Since the current waveform acquired in this embodiment is a sinusoidal wave, and the pre-charge resistance $R_1$ is known, the theoretical reference values of the first current $I_1$ and the third current $I_3$ can be calculated. Therefore, this embodiment may be used to detect whether the current detection loop of the first current $I_1$ and the third current $I_3$ can normally operate, and to determine the accuracy of the sensed current values of the first current $I_1$ and the third current $I_3$. The advantage of this embodiment is that during the current detection process, the capacitor assembly 30 will not have voltage, so some sub-circuits that rely on the voltage of the capacitor assembly 30 will not be affected at all, and therefore some applications that have special requirements on the startup sequence can use this embodiment to implement.

Accordingly, the control unit 50 receives the current detection signals corresponding to the first current $I_1$ and the third current $I_3$ to determine whether the current detection loop is normal. Since each phase in the AC-DC conversion circuit has the same structure, that is, the sensed current values of the first current $I_1$, the second current $I_2$, and the third current $I_3$ will all be the same. Therefore, in the normal operation of the circuit, the current detection the second current $I_2$ may be verified by comparing the three-phase currents.

Figure 13:
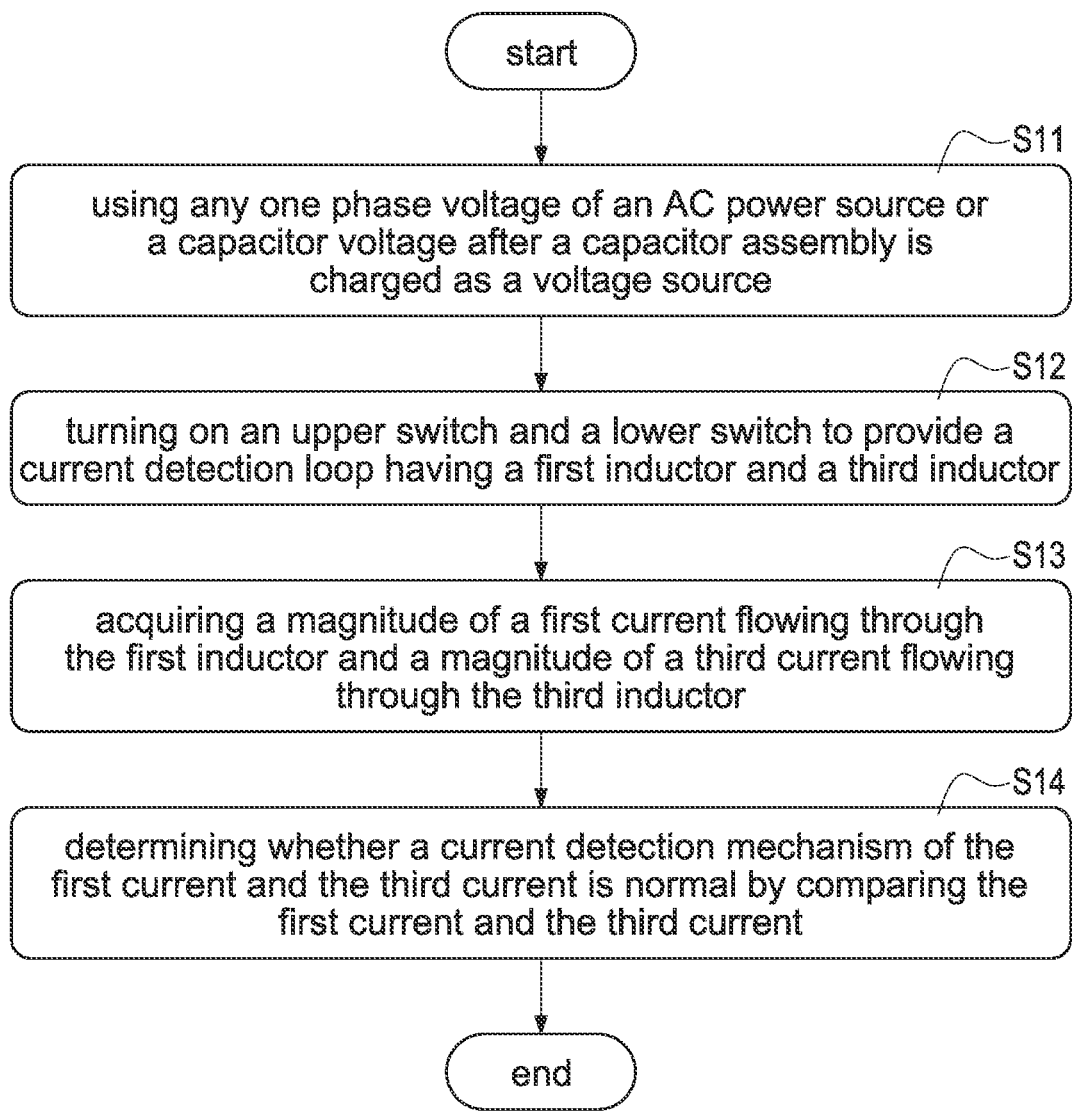
FIG. 13 is a flowchart of a method of detecting an input current of a single-phase and three-phase compatible AC-DC conversion circuit according to the present disclosure.

Please refer to FIG. 13, which shows a flowchart of a method of detecting an input current of a single-phase and three-phase compatible AC-DC conversion circuit according to the present disclosure. The method includes the following steps of using any one phase voltage of the AC power source or a capacitor voltage after the capacitor assembly is charged as a voltage source (S11). Afterward, turning on the upper switch and the lower switch to provide a current detection loop comprising the first inductor and the third inductor (S12). Afterward, acquiring a magnitude of a first current flowing through the first inductor and a magnitude of a third current flowing through the third inductor (S13). Finally, determining whether a current detection mechanism of the first current and the third current is normal by comparing the first current and the third current (S14).

In summary, the present disclosure has the following features and advantages:
1. The single-phase and three-phase compatible AC-DC conversion circuit having input current detection provides switching components to implement input single-phase voltage and three-phase voltage compatibility, and the state changes of the switching component may be used to cooperate with the circuit power switching components and the existing pre-charge resistor $R_1$ to generate the current detection loop to check whether the current sensing devices (such as current sensors) are normal, and therefore no additional components are needed, which can save the circuit cost and reduce the circuit size.
2. There is no need to add additional circuit components, only the internal circuit power switch components of the on-board charger are used with the pre-charge resistor, and since the current detection loop includes pre-charge resistor, the current stress flowing through the components can be reduced.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A single-phase and three-phase compatible AC-DC conversion circuit with input current detection, disposed between an AC side and a DC side, the AC side comprising a three-phase power source, the AC-DC conversion circuit comprising:
a first inductor, a second inductor, and a third inductor,
a switch bridge arm assembly, comprising:
three switch bridge arms, each of the switch bridge arms comprising an upper switch and a lower switch connected in series; a plurality of common-connected nodes between the upper switches and the corresponding lower switches respectively coupled to the three-phase power source through the first inductor, the second inductor, and the third inductor,
a fifth switching component, coupled between a first phase of the three-phase power source and the common-connected node of the switch bridge arm corresponding to a third phase of the three-phase power source,
a pre-charge resistor, coupled between the firth phase and the first inductor,
a capacitor assembly, coupled to the switch bridge arm assembly in parallel to form the DC side, and
a control unit, configured to turn on the upper switch of the switch bridge connected to the first inductor, the lower switch of the switch bridge connected to the third inductor, and the fifth switching component to provide a current detection loop having the first inductor, the third inductor, and the fifth switching component,
wherein the control unit acquires a magnitude of a first current flowing through the first inductor and a magnitude of a third current flowing through the third inductor, and determines whether a current detection mechanism of the first current and the third current is normal.

2. The AC-DC conversion circuit as claimed in claim 1, further comprising:
a ninth switching component, coupled between the third inductor and a neutral node of the three-phase power source.

3. The AC-DC conversion circuit as claimed in claim 1, wherein a first phase voltage of the three-phase power source charges the capacitor assembly to build a capacitor voltage.

4. The AC-DC conversion circuit as claimed in claim 3, further comprising:
an eighth switching component, coupled to the pre-charge resistor in series,
wherein the control unit turns on the eighth switching component and the fifth switching component so that the capacitor voltage discharges through the pre-charge resistor and the control unit acquires the magnitude of the first current and the magnitude of the third current.

5. The AC-DC conversion circuit as claimed in claim 3, wherein when the capacitor voltage reaches to a peak value of the first phase voltage, the capacitor voltage discharges through the pre-charge resistor.

6. The AC-DC conversion circuit as claimed in claim 1, wherein the switch bridge arms comprise:
a first switch bridge arm, comprising a first switch and a second switch coupled to the first inductor,
a second switch bridge arm, comprising a third switch and a fourth switch coupled to the second inductor, and
a third switch bridge arm, comprising a fifth switch and a sixth switch coupled to the third inductor and the fifth switching component,
wherein the control unit turns on the fifth switching component and turns on the first switch and the sixth switch to provide the current detection loop.

7. The AC-DC conversion circuit as claimed in claim 1, further comprising:
a diode bridge arm, coupled to the switch bridge arm assembly in parallel,
a sixth switching component, coupled to the diode bridge arm, and
a seventh switching component, coupled to the sixth switching component and a neutral node of the three-phase power source.

8. The AC-DC conversion circuit as claimed in claim 1, wherein the control unit determines whether the current detection mechanism of the first current and the third current is normal according to a current difference between the first current and the third current or a comparison between an average value of the first current and the third current with a preset reference current value.

9. The AC-DC conversion circuit as claimed in claim 2, further comprising:
an eighth switching component, coupled to the pre-charge resistor in series,
wherein a first phase voltage of the three-phase power source supplies power through the pre-charge resistor and the control unit turns on the eighth switching component and the ninth switching component so that the control unit acquires the magnitude of the first current and the magnitude of the third current.

10. The AC-DC conversion circuit as claimed in claim 9, wherein the switch bridge arms comprise:
a first switch bridge arm, comprising a first switch and a second switch coupled to the first inductor and the eighth switching component,
a second switch bridge arm, comprising a third switch and a fourth switch coupled to the second inductor, and
a third switch bridge arm, comprising a fifth switch and a sixth switch coupled to the third inductor and the fifth switching component.

11. The AC-DC conversion circuit as claimed in claim 10, wherein the control unit further turns off the first switch, turns on the second switch, turns on the fifth switch, and turns off the sixth switch so that the first phase voltage in a positive-half cycle generates the current detection loop through the pre-charge resistor, a body diode of the first switch, the fifth switch, and the ninth switching component, and through the pre-charge resistor, the second switch, a body diode of the sixth switch, and the ninth switching component.

12. The AC-DC conversion circuit as claimed in claim 10, wherein the control unit further turns off the first switch, turns on the second switch, turns off the fifth switch, and turns on the sixth switch so that the first phase voltage in a positive-half cycle generates the current detection loop through the pre-charge resistor, the second switch, the sixth switch, and the ninth switching component.

13. The AC-DC conversion circuit as claimed in claim 10, wherein the control unit further turns off the fifth switch, turns on the sixth switch, turns on the first switch, and turns off the second switch so that the first phase voltage in a negative-half cycle generates the current detection loop through the ninth switching component, the sixth switch, a body diode of the second switch, and the pre-charge resistor, and through the ninth switching component, a body diode of the fifth switching component, the first switch, and the pre-charge resistor.

14. The AC-DC conversion circuit as claimed in claim 10, wherein the control unit further turns off the fifth switch, turns on the sixth switch, turns off the first switch, and turns on the second switch so that the first phase voltage in a negative-half cycle generates the current detection loop through the ninth switching component, the sixth switch, and the pre-charge resistor.

15. A method of detecting an input current of a single-phase and three-phase compatible AC-DC conversion circuit, the AC-DC conversion circuit receiving an AC power source; the AC-DC conversion circuit comprising a first inductor, a second inductor, a third inductor, three switch bridge arms, a pre-charge resistor, a fifth switching component, and a capacitor assembly; each of the switch bridge arms comprising an upper switch and a lower switch connected in series, and a plurality of common-connected nodes between the upper switches and the corresponding lower switches respectively coupled to the three-phase power source through the first inductor, the second inductor, and the third inductor; the method comprising steps of:
(a) using any one phase voltage of the AC power source or a capacitor voltage after the capacitor assembly is charged as a voltage source,
(b) turning on at least the upper switch of the switch bridge connected to the first inductor, the lower switch of the switch bridge connected to the third inductor, and the fifth switching component to provide a current detection loop comprising the first inductor, the third inductor, and the fifth switching component, (c) acquiring a magnitude of a first current flowing through the first inductor and a magnitude of a third current flowing through the third inductor, and (d) determining whether a current detection mechanism of the first current and the third current is normal by comparing the first current and the third current.

16. The method as claimed in claim 15, further comprising a step of:

turning on the fifth switching component so that the capacitor voltage discharges through the pre-charge resistor to acquire the magnitude of the first current and the magnitude of the third current.

* * * * *